Nov. 20, 1934.  R. J. KEHL  1,981,624
WELDING APPARATUS
Original Filed Nov. 19, 1932   3 Sheets-Sheet 1

INVENTOR
ROBERT J. KEHL
BY
ATTORNEY

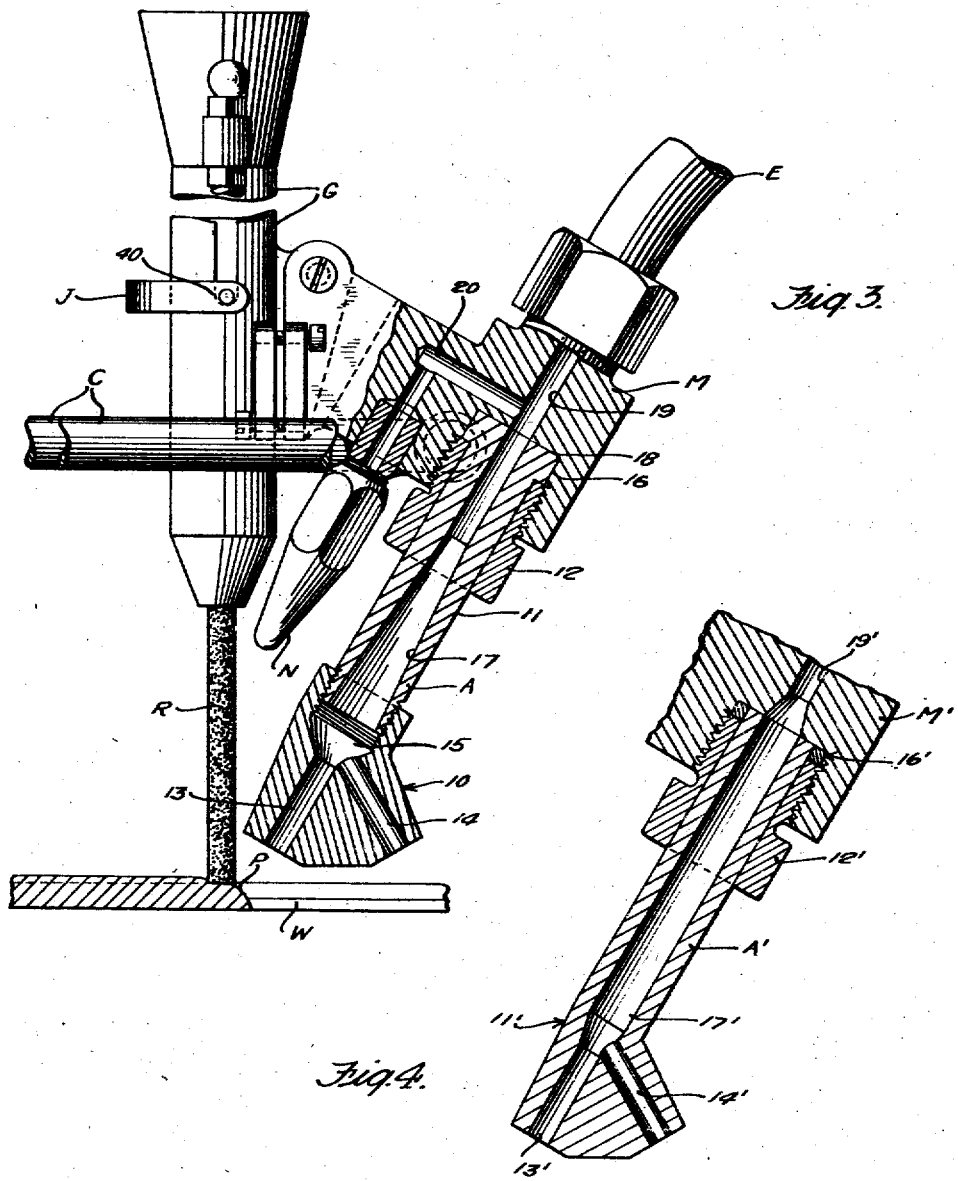

Nov. 20, 1934.　　　　R. J. KEHL　　　　1,981,624
WELDING APPARATUS
Original Filed Nov. 19, 1932　　3 Sheets-Sheet 3
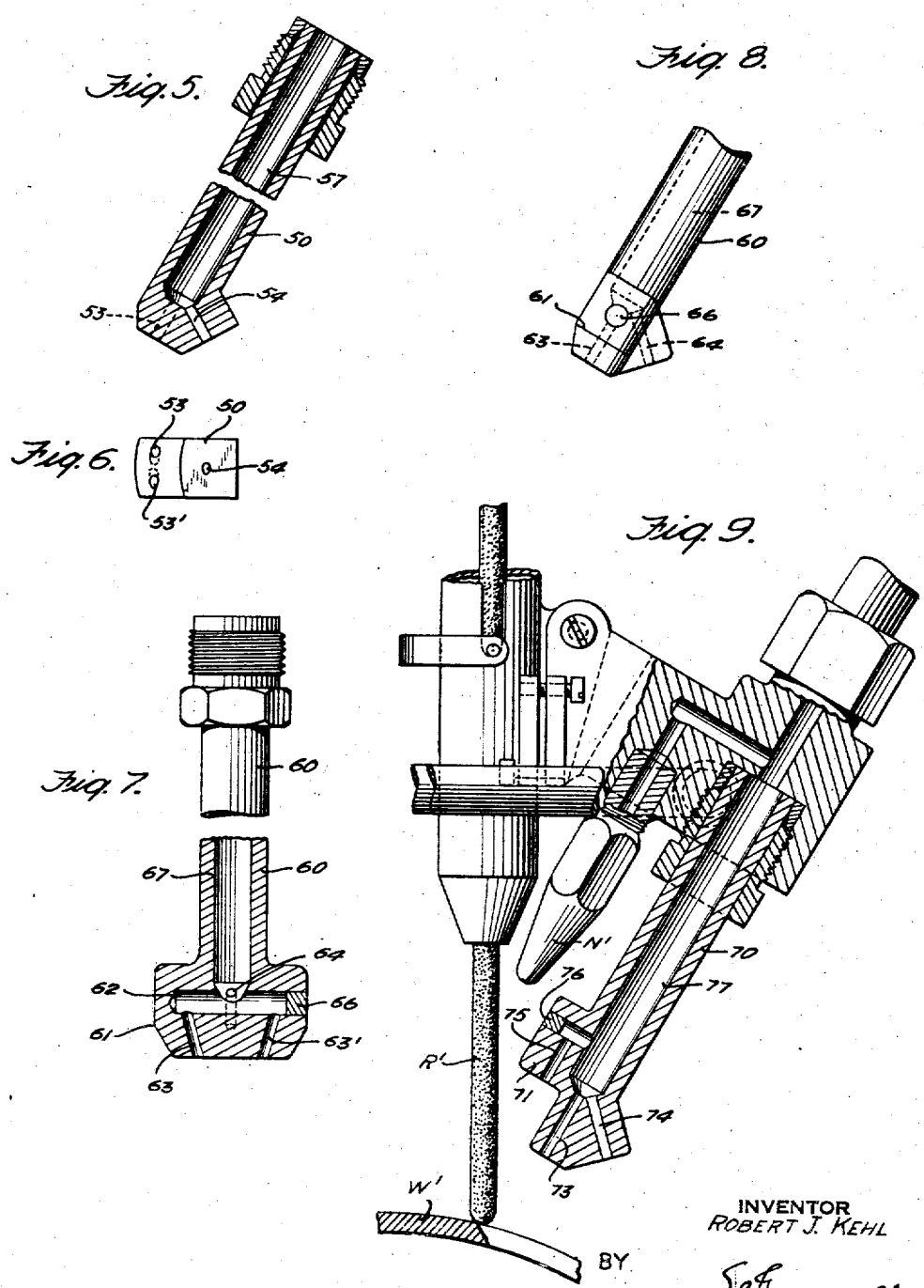
INVENTOR
ROBERT J. KEHL
BY
Greenewald
ATTORNEY Patented Nov. 20, 1934

1,981,624

UNITED STATES PATENT OFFICE 1,981,624

WELDING APPARATUS

Robert J. Kehl, Bayside, N. Y., assignor to The Linde Air Products Company, a corporation of Ohio Application November 19, 1932, Serial No. 643,333
Renewed April 21, 1934

26 Claims. (Cl. 113—59)

The present invention relates to welding apparatus and more particularly to an improved welding blowpipe adapted for use with hand welding apparatus of the type disclosed in application Serial No. 576,894 filed in my name on November 23, 1931.

The apparatus disclosed in said application comprises broadly: a heating unit, as an oxy-acetylene torch or blowpipe, for creating a welding temperature at a welding point; a rod guide for directing a welding rod to said point; a carriage having runners adapted to contact with the work in order to support most of the weight of the apparatus and to provide an axis about which the torch may be manipulated, and a separate tip for producing a preheating flame. This separate tip has heretofore been connected by a tube with the welding head and the flame supplied thereby has been directed approximately perpendicularly to the seam to be welded and applied at a point which is a comparatively long distance in front of the welding point.

In order to attain greater efficiency in welding it is necessary to apply the preheating flame closer to the welding point and to direct the same at a more efficient acute angle along the unwelded portion of the seam away from the welding point. The preheating flame is usually adjusted to heat the edges to be welded to a temperature just below fusion and, by locating this flame as close as possible to the welding flame but so as not to interfere with the latter, the preheated edges will have less opportunity to cool in the interval between the application of these flames to the same areas. By thus reducing heat losses, the economy of the welding operation is improved and the linear speed of welding may be increased materially.

Accordingly, the principal objects of this invention are to provide an improved welding apparatus in which a preheating flame may be applied at an acute angle to the seam or work and relatively close to the welding point but in a direction along the unwelded seam away from such point; and to provide an improved blowpipe for such apparatus having a novel unitary tip adapted to deliver such angularly-related welding and preheating jets, which tip shall be readily adjustable to position the jet outlets thereof into the same plane with the seam, the rod feeding device, and the rod preheating tip of the apparatus.

The above and further objects will appear from the following specification and the accompanying drawings, of which, Figs. 1 and 2 are, respectively, side and plan views of welding apparatus embodying this invention;

Fig. 3 is an enlarged view, partly in section, of the improved welding and preheating tip and associated parts;

Fig. 4 is an enlarged sectional view of another welding and preheating tip embodying this invention;

Figs. 5 and 6 show respectively a side and an end view of a tip having two diverging outlets for producing separate and closely adjacent welding jets;

Figs. 7 and 8 show respectively a side and an end view of a tip having two outlets for producing converging welding jets; and Fig. 9 is a side view of a tip having an outlet parallel to the welding outlet for additionally preheating the weld rod and for assisting the welding jet; the tip is shown in relation to a weld rod, a weld rod preheating tip and the work.

Figure 1:
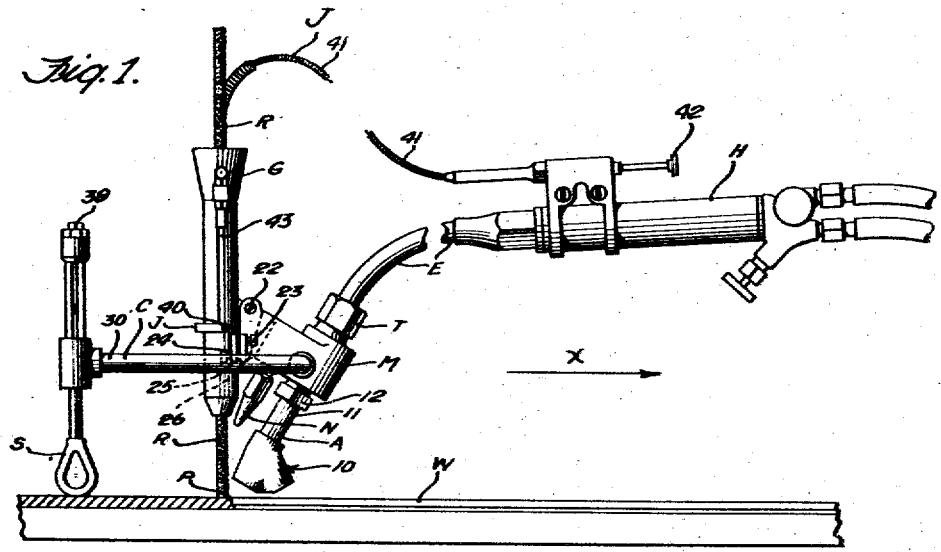
Figure 2:
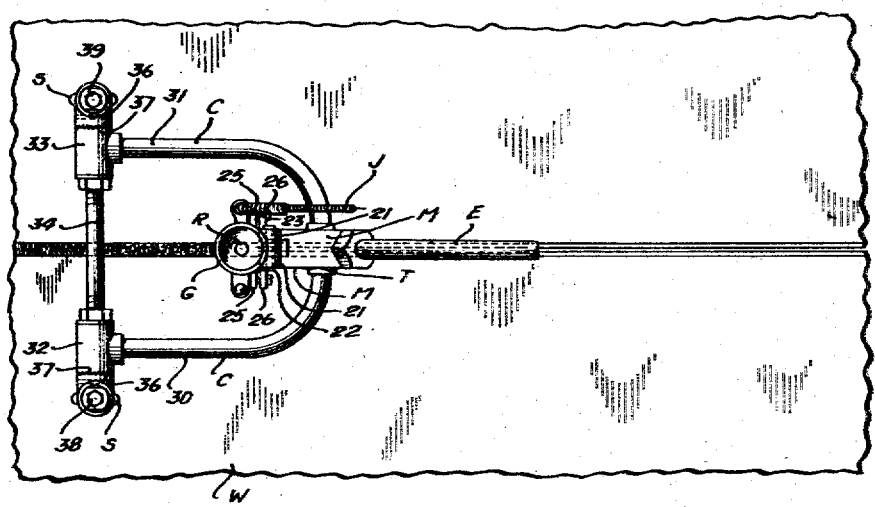

The apparatus, as shown in Figs. 1 and 2, comprises a heating unit, such as an oxy-acetylene blowpipe or torch T; a guide G and adjuster J for feeding the welding rod R to a welding point P; and a carriage C connected with the torch and having supports or runners S which are adjustably connected to the carriage and capable of adapting the same to rest on various contours of work surface. The blowpipe comprises a suitable gas-distributing head M which communicates with and is secured to a gas-conveying tube E that carries a handle H for raising and lowering the torch to vary the intensity of the heat applied to the work.

The gas-distributing or welding head M has detachably connected thereto means for delivering jets of combustible gases, such as a mixture of acetylene and oxygen, to produce the welding and preheating flames. A suitable detachable tip N communicates with a gas passage in the head and produces a flame for preheating the welding rod R before the rod is melted in the welding flame. A nozzle A may supply welding and preheating flames to the work and, as shown in Fig. 3, the preferred form of nozzle comprises a lower double tip 10 detachably connected to a nipple 11 which is secured to the welding head M by an externally threaded nut 12.

The tip 10 is provided with a drilled outlet 13 and an angularly drilled outlet 14, both outlets opening into a larger tapped drilling 15 which is coaxial with the outlet 13. The proper angle between outlets 13 and 14 may be determined from the inclination of head M and from the character of the work to be welded, heavier work requiring a smaller angle between the outlets in order to concentrate the preheating flame from outlet 14 more locally and nearly vertically upon the edges of the work. It will be readily appreciated that a number of similar tips having outlets varying in size and in degree of angularity from one another may be employed in conjunction with the type of nozzle shown.

The nipple 11 is threaded at its lower end for connection with the tip 10 and is provided with a flange 16 at its upper end. A flaring axial drilling 17 narrows from a wide area at the bottom to a smaller area substantially one third of the distance from the upper end; the two drillings 17 and 15 together providing a chamber in which the gas is more thoroughly mixed before it is delivered to the outlets 13, 14. The drilling 17 is uniform for the remaining upper third of the nipple, forming a restriction which aids in the prevention of flashbacks.

By means of the externally threaded nut 12 bearing against the under side of the flange 16 and cooperating with threads in the welding head M, a gas tight connection may be made between nozzle A and the bottom of the cavity 18 in the head M. When the nut 12 is loosened, the nipple 11 is free to turn within the nut 12, so that the tip 10 and its outlets may be readily aligned with the rod preheating tip N, the rod guide G and rod R, and with the central axis of the welding apparatus, as well as with the work. The tube E supplies the combustible gas mixture to a passage 19 in the head, and from this passage most of the gas is supplied to the alined passage 17 and the outlets 13, 14 while a much smaller volume of the mixture is delivered through a branch passage 20 to the rod preheating tip N which is detachably secured to the head M and lies in the same plane as the nipple 11 and the guide G.

The nipple and the tip for the welding and work-preheating jets may be combined in a one-piece nozzle A', as shown in Fig. 4. The delivery end of the nipple 11' may be enlarged laterally and is drilled to provide outlets 13' and 14' for supplying welding and preheating gases, respectively. The outlet 13' is axially in line with the larger central drilling 17' and the outlet 14' communicates with the latter and is disposed at an angle to the outlet 13'. The size of drilling 17' is larger than the gas passage 19' leading from the handle H and therefore acts as a chamber to more thoroughly mix the gas before it is delivered to the preheating and welding flames. A coupling nut 12' may be slipped over the other end of the nipple and an annular flange 16' may then be soldered to this end of the nipple. Nut 12' is externally threaded for connecting the nozzle A' to the head M.

It will be evident that the nozzles A, A' are so constructed that the work-preheating jets supplied by the outlets 14, 14' may be located quite close to the welding jets supplied by the outlets 13, 13'. With this arrangement it is possible to employ increased welding speeds since considerable heat economy will result, not only because there is a much shorter cooling interval between the application to the work of preheat and welding heat but also because of the inclined relation of the preheating jet to the work, which causes the preheating flame to extend farther along the unwelded work to utilize more of the heat of the preheating flame. It will also be apparent that only a simple manipulation of the coupling nuts 12 or 12' and rotary adjustment of nozzles A, A' is required to position both the welding and the preheating outlets of these nozzles exactly in the same plane with the seam to be welded and in the same central plane of the apparatus with the rod guide G and the rod preheating tip N.

The head M and the rod guide G may be pivotally connected and secured together by interengaging fingers 21 and a detachable bolt 22 extending therethrough. The rod guide is angularly adjustable about this bolt by means of screws 23 and 24 in push and pull relation; the screws extending through opposing pairs of ears 25 and 26 respectively extending from both sides of the rod guide and welding head.

The carriage C comprises a pair of arms 30, 31 secured to and extending rearwardly from the welding head M, to connect with bearing heads 32, 33 which are provided with hollow bores for receiving the transverse bar 34. Bar 34 is joined at either end with supports S and made angularly adjustable by milled adjoining surfaces 36, 37 on the supports and on the bearing heads 32, 33. Nuts 38, 39 at the upper ends of the supports S may be provided for lengthening and shortening the supports to fit the contour of the work.

The welding rod adjuster J comprises a rod lifter 40 attached to a Bourdon control which consists of a flexible wire 41 connected with a pull button mechanism 42 on the handle H. The lifter 40 is mounted to slide in grooves 43 in the rod guide G and is provided with arms for gripping the sides of welding rod R.

In use, the apparatus is positioned relatively to the work W, as shown in Fig. 1, with the runners S supporting most of the weight on the work along a line or transverse axis some distance behind the welding point P, while the rest of the weight is supported by the operator's hand which grasps the handle H. The welding head M, the nozzle A, and its tip are so positioned and inclined to the work that the welding jet is directed rearwardly toward the welding point P and the preheating jet is directed forwardly onto and along the unwelded seam while the apparatus is moved in the direction of the arrow X; or, reversely, while the apparatus is stationary and the work moves in a direction opposite that indicated by the arrow. During this relative movement, the operator may vary the heat applied to the work by raising or lowering the handle H, thereby rocking the apparatus about the fulcrum provided by the runners S and varying the distance between the work and the tip of the nozzle A.

Other forms of nozzles may be employed in place of nozzle A, and similarly, various other tips may be substituted for the tip 10. One alternate form of nozzle is shown in Figs. 5 and 6 and comprises a nipple 50 having two diverging welding outlets 53, 53' drilled from the lower end of the nipple in the same longitudinal plane as the central gas passage 57. The outlets 53, 53' may be made substantially parallel to one another, but whether diverging or parallel the outlets will direct a welding jet against either side of the usual weld V. An outlet 54 is drilled at a suitable angle to the welding outlets and to the passage 57 for providing a work preheating jet. The diameter of outlet 54 may be appreciably smaller than the diameters of the welding outlets 53, 53' because the heat produced by the work preheating jet does not need to be so intense as the welding heat produced by outlets 53, 53'.

Figs. 7 and 8 illustrate another form of nozzle 60 having an enlarged lower end 61 enclosing a transverse chamber 62 which is drilled through one side of the nozzle substantially at a right angle to the central gas passage 67. A suitable plug 66 soldered into place may close off the hole made in the side of the nozzle. Two welding outlets 63, 63' are drilled preferably in the plane of passage 67 and at an angle with one another so that they converge from either extremity of the chamber 62 toward the end of the nozzle. When so arranged the welding outlets will produce a single broad jet directed rearwardly against the work. An outlet 64 which may be of smaller diameter than outlets 63, 63' is drilled at a convenient angle to said outlets 63, 63' and to the passage 62. The size of the drilling 64 is dependent upon the amount of heat required to preheat the work ahead of the welding point.

Still another form of nozzle 70 is shown in Fig. 9 in welding position with relation to a weld rod R', a weld rod preheating tip N' and the work W'. The nozzle is similar to that shown in Fig. 4, having a main welding outlet 73 and a work preheating outlet 74 at an angle thereto and directed forwardly against the work. In addition the nozzle is provided with a stepped back portion 71 which has a surface or shoulder preferably parallel and relatively close to the lower end of the nozzle. A passage 75 is made in the stepped back portion of the nozzle and comprises an outlet drilling which is substantially parallel with outlet 73 and a short angular drilling connecting with a central chamber 77 of the nozzle. The short angular drilling is made through the side of the nozzle and so that a plug 76 is required to close off the opening. The outlet 75 directs an assisting jet toward the end of the weld rod for producing additional preheat and toward the welding point for assisting the main welding jet from outlet 73. The outlet 74 for the work preheating jet may be smaller in diameter than the other outlets and produce a less intense heat.

While the improved apparatus is herein shown and described in detail it will be understood that various changes may be made therein without departing from the scope of the invention.

I claim:

1. In welding apparatus, the combination of a welding rod guide; a welding head secured to said guide and adjustable relatively thereto; and a nozzle secured to said head and having outlets for a welding jet and a preheating jet, said outlets being so inclined relatively to each other that the welding jet will be directed to the welding point approximately at the point where a welding rod fed through said guide touches the work and said preheating jet will be directed onto the unwelded work relatively close to but in a direction away from said welding point.

2. In welding apparatus, the combination of a guide adapted to feed a welding rod to a seam to be welded; a nozzle having outlets for a welding jet and a seam-preheating jet; and means whereby said nozzle is adjustable to position said outlets in the same plane with said guide and said seam.

3. In welding apparatus, the combination of a guide adapted to feed a welding rod to the welding point of a seam to be welded; a nozzle adjustable independent of said guide and having outlets, one of said outlets being adapted to apply a welding jet to said welding point and another of said outlets being adapted to apply a preheating jet to said seam close to said welding point but inclined away from said welding jet onto and along the unwelded seam; and means whereby said nozzle is adjustable to position said outlets in the same plane with said guide and said seam.

4. In welding apparatus, the combination of a welding rod guide; a rod-preheating tip adapted to apply a preheating jet to a welding rod fed through said guide; a nozzle having outlets for a welding jet and a work-preheating jet; and means whereby said nozzle is adjustable to position said outlets in the same plane with said guide and said rod-preheating tip.

5. In welding apparatus, the combination of a welding rod guide; a welding head adjustably secured thereto; a rod-preheating tip secured to said head and adapted to apply a preheating jet to a welding rod fed through said guide; a nozzle having outlets for a welding jet and a work-preheating jet; and means for securing said nozzle to said head, said securing means being adjustable to position the nozzle outlets in the same plane with said guide and said rod-preheating tip.

6. In welding apparatus, the combination of a welding unit comprising a nozzle for providing welding heat at a welding point and for providing heat a relatively short distance ahead of the welding point, said nozzle being adjustable for alignment with the seam to be welded in the work, and means adapted to support at least part of the weight of said unit upon the work behind the welding point.

7. In welding apparatus, the combination of a welding unit comprising a heating nozzle having an outlet providing a jet for welding heat at a welding point and an outlet providing a jet for heat at a relatively short distance ahead of the welding point; a guide directing a welding rod to said point; means providing heat to preheat said welding rod; and means for aligning said jets of the heating nozzle with the rod-preheating means and with the welding rod-guide.

8. In welding apparatus, the combination of a welding unit comprising a heating nozzle for providing welding heat at a welding point and for providing heat at a relatively short distance ahead of the welding point; a guide for directing a welding rod to said point; means providing heat to preheat said welding rod; means adapted to support at least part of said unit upon the work behind the welding point; and means for aligning said heating nozzle with the rod-preheating means and with the welding rod guide.

9. Welding apparatus comprising a welding unit adapted to be moved relative to the surface of the work and means for supporting at least part of said welding unit on said work; said welding unit including a blowpipe provided with a nozzle having outlets for delivering jets to provide heating flames at separate points ahead of said supporting means as the welding unit is moved relative to the work, said jets being relatively close to each other, one serving to direct a preheating flame forwardly against the work and the other serving to direct a welding flame rearwardly to a welding point.

10. Welding apparatus comprising a welding unit adapted to be moved relative to the surface of the work and means for supporting at least part of said welding unit on said work; said welding unit including a blowpipe provided with a nozzle having a plurality of outlets for providing heating flames at separate points ahead of said supporting means as the welding unit is moved relatively to the work, a welding rod guide; and a tip for preheating the welding rod; the outlets of said nozzle directing a preheating flame forwardly against the work and a welding flame rearwardly to a welding point on the work; and means for aligning the outlets of said nozzle with the rod preheating tip and the welding rod guide.

11. In welding apparatus, the combination of a welding unit comprising a welding rod guide; a welding head having a threaded recess therein; a nipple provided with a flange fitting within said recess and a hollow nut detachably connected within said head and bearing against the under side of said flange; and a tip secured to the lower end of the nipple and having outlets for a welding jet and a preheating jet, said outlets being so inclined relatively to each other that the welding jet is directed to the welding point approximately at the point where a welding rod fed through said guide touches the work and said preheating jet is directed onto the unwelded work relatively close to but in a direction away from said welding point.

12. In welding apparatus, the combination of a welding unit comprising a welding rod guide; a rod-preheating tip; a welding head having a threaded recess therein; a nozzle provided with outlets for a welding jet and a seam-preheating jet, said nozzle extending downward from the welding head; and a hollow nut for securing the nozzle tightly within the recess in the head and for aligning the welding jet and seam-preheating jet in the same plane with the rod-preheating tip, the rod guide, and the seam in the work.

13. A welding nozzle comprising a nipple portion attachable to a welding head and provided with a longitudinal gas passage, and a tip portion having outlets for delivering welding and preheating jets, the outlet for the welding jet being axially in line with said longitudinal gas passage and the outlet for the preheating jet extending from said longitudinal passage at an angle to such welding jet outlet.

14. A welding nozzle comprising a nipple portion attachable to a welding head and provided with a longitudinal gas passage expanding toward the lower end thereof; and a tip portion having an enlarged chamber in alignment with the nipple passage and having outlets for delivering welding and preheating jets, the outlet for the welding jet being axially in line with said enlarged chamber and the outlet for the preheating jet extending from said enlarged chamber at an angle to such welding jet outlet.

15. A welding nozzle comprising a nipple portion attachable to a welding head and provided with a longitudinal gas passage; an annular flange secured to the upper end of said nipple portion; adjustable means bearing against said annular flange for attaching the nipple portion to and aligning the same with the welding head; and a tip portion having outlets for delivering welding and preheating jets, the outlet for the welding jet being axially in line with said longitudinal gas passage and the outlet for the preheating jet extending at an angle from such gas passage.

16. A welding nozzle comprising a nipple portion attachable to a welding head and provided with a gas passage, and a tip portion connected to said nipple portion and having outlets for delivering welding and preheating jets, the outlet for the welding jet being substantially in line with said gas passage and the axis of the outlet for the preheating jet being disposed at an angle to the axis of said gas passage.

17. The combination with a welding head, of a welding nozzle secured thereto, said nozzle having a gas passage terminating in a tip portion having outlets for delivering welding and preheating jets, said outlets communicating with said gas passage and their axes forming an angle greater than about 60 degrees.

18. A welding nozzle comprising a nipple attachable to a welding head, provided with a longitudinal gas passage, and having outlets for delivering welding and preheating jets; the outlets for the welding jet being in the axial plane of said longitudinal passage and converging toward one another for producing a broad single jet, and the outlet for the preheating jet extending from said longitudinal passage at an angle to the plane of the welding jet outlets.

19. A welding nozzle comprising a nipple attachable to a welding head, provided with a longitudinal gas passage, and having outlets for delivering welding and preheating jets, the outlets for the welding jets being in the axial plane of said longitudinal passage and diverging away from one another for producing independent jets, and the outlet for the preheating jet extending from said longitudinal passage at an angle to the plane of the welding jet outlets.

20. In welding apparatus, the combination of a guide adapted to feed a welding rod to a seam to be welded; a nozzle adjustable independently of said guide and having outlets for welding jets and a seam preheating jet, said welding outlets being in the plane of the nozzle passage and directed away from each other toward either side of the welding point where a welding rod fed through said guide touches the work, and said preheating outlet being directed onto the unwelded work relatively close to but in a direction away from the welding point.

21. In welding apparatus, the combination of a guide adapted to feed a welding rod to the welding point of a seam to be welded; a nozzle independent of said guide and having outlets, two of said outlets converging toward each other and being adapted to apply a broad welding jet to said welding point and another of said outlets adapted to apply a preheating jet to said seam close to said welding point but inclined away from said welding jet onto and along the unwelded seam; and means whereby said nozzle is adjustable to position said outlets in alignment with said guide and said seam.

22. In welding apparatus, the combination of a guide adapted to feed a welding rod to the welding point of a seam to be welded; a nozzle having outlets, one of said outlets being adapted to apply a welding jet to said welding point, another of said outlets being adapted to apply a heating jet to the welding rod and another of said outlets being adapted to apply a preheating jet to said seam close to said welding point but inclined away from said welding jet onto and along the seam to be welded; and means whereby said nozzle is adjustable to position said outlets in the same plane with said guide and said seam.

23. In welding apparatus, the combination of a welding rod guide; a rod preheating tip adapted to apply a preheating jet to a welding rod fed through said guide; a nozzle having outlets for a welding jet, an assisting jet, and a work-preheating jet, the outlet for said assisting jet being adapted to direct a flame substantially parallel and relatively close to said welding jet for additionally preheating the rod and for supplementing the welding jet; and means whereby said nozzle is adjustable to position said outlets in the same plane with the guide and the rod preheating tip.

24. A welding nozzle comprising a nipple attachable to a welding head and provided with a longitudinal gas passage; said nipple having an outlet for delivering a welding jet, an outlet above and substantially parallel to said welding outlet for delivering an assisting jet, and an outlet in the same plane with both said welding and assisting jet outlets for directing a preheating jet forwardly against the work at an angle to said longitudinal gas passage.

25. In welding apparatus, the combination of a head having a passage for supplying combustible gas; a welding nozzle comprising a nipple portion and a tip portion, said nipple portion having a main longitudinal gas passage adapted to communicate with the supply passage in said head, and said tip portion having separate outlets communicating with said longitudinal passage and respectively adapted to deliver a welding jet and a preheating jet, the axes of said outlets converging within said main passage; and means cooperating with said nipple portion to secure said nozzle to said head, such securing means being adjustable so that the outlets for both said welding jet and said preheating jet may be readily positioned in the same plane with the seam to be welded.

26. In welding apparatus, the combination of means for guiding and directing a welding rod toward the work; means including a structure provided with a plurality of passages having outlets and forming a nozzle for providing a welding flame and a preheating flame; said structure being so constructed and arranged that the welding flame produced at the outlet of one of said passages is directed on a seam of the work to form a welding region at a point where the welding rod contacts the work and the preheating flame produced at the outlet of another of said passages is directed on an unwelded portion of the seam close to the point where the welding rod contacts the work and at an angle inclined therefrom; and means for adjusting said structure for positioning the outlets of said passages in the same plane as said guiding means and the seam of the work.

ROBERT J. KEHL.

CERTIFICATE OF CORRECTION.

Patent No. 1,981,624. November 20, 1934.

ROBERT J. KEHL.

It is hereby certified that error appears in the printed specification of the above numbered patent requiring correction as follows: Page 4, first column, line 35-36, claim 13, strike out the words "comprising a nipple portion"; same claim, line 37, strike out the comma and word ", and" and insert the words terminating in; and that the said Letters Patent should be read with these corrections therein that the same may conform to the record of the case in the Patent Office.

Signed and sealed this 25th day of February, A. D. 1936.

Leslie Frazer (Seal) Acting Commissioner of Patents.